(12) United States Patent
Fritsch et al.

(10) Patent No.: US 11,609,132 B2
(45) Date of Patent: Mar. 21, 2023

(54) LOAD CELL

(71) Applicant: Bizerba SE & Co. KG, Balingen (DE)

(72) Inventors: Andreas Fritsch, Balingen (DE); Frank Metzger, Albstadt (DE); Harald Witte, Balingen (DE); Luca Kallmann, Wellendingen (DE)

(73) Assignee: BIZERBA SE & CO. KG, Balingen (DE)

( * ) Notice: Subject to any disclaimer, the term of this patent is extended or adjusted under 35 U.S.C. 154(b) by 225 days.

(21) Appl. No.: 17/121,807

(22) Filed: Dec. 15, 2020

(65) Prior Publication Data
US 2021/0199519 A1 Jul. 1, 2021

(30) Foreign Application Priority Data
Dec. 30, 2019 (EP) ..................................... 19220094

(51) Int. Cl.
| *G01L 1/00* | (2006.01) |
|---|---|
| *G01L 1/22* | (2006.01) |
| *G01L 1/20* | (2006.01) |

(52) U.S. Cl.
CPC .............. *G01L 1/225* (2013.01); *G01L 1/205* (2013.01); *G01L 1/2206* (2013.01); *G01L 1/2287* (2013.01)

(58) Field of Classification Search
CPC ....... G01L 1/225; G01L 1/205; G01L 1/2206; G01L 1/2287
See application file for complete search history.

(56) References Cited

U.S. PATENT DOCUMENTS

| 4,396,079 A | 8/1983 | Brendel |
|---|---|---|
| 4,655,305 A | 4/1987 | Jacobson |
| (Continued) | | |

FOREIGN PATENT DOCUMENTS

| CN | 110169685 A | 8/2019 |
|---|---|---|
| DE | 3733961 A1 | 4/1989 |
| (Continued) | | |

OTHER PUBLICATIONS

Load Cells; Editorial by Industrial Quick Search; accessed on Nov. 8, 2022; pp. 1-27; Grand Rapids, MI.
(Continued)

*Primary Examiner* — Max H Noori
(74) *Attorney, Agent, or Firm* — Leydig, Voit & Mayer, Ltd.

(57) ABSTRACT

A load cell has a monolithic measuring body. The monolithic measuring body has: a force-supporting section; a force-introduction section; and a linkage section disposed between the force-supporting section and the force-introduction section. The monolithic measuring body has a longitudinal axis between a force-supporting-side axial end and a force-introduction-side axial end. The longitudinal axis is configured to extend in a horizontal direction. The monolithic measuring body further has, in the force-supporting section, at least one mounting hole for attachment of the monolithic measuring body, the axis of the at least one mounting hole extending in the horizontal direction. At least one strain gauge is configured to sense tensile or compressive deformation of the monolithic measuring body and is in a region of the linkage section on a top side or a bottom side of the monolithic measuring body, the at least one strain gauge being oriented in the horizontal direction.

16 Claims, 5 Drawing Sheets

(56) References Cited

U.S. PATENT DOCUMENTS

| | | | | |
|---|---|---|---|---|
| 5,293,007 | A * | 3/1994 | Darst | G01L 1/2243 73/1.13 |
| 5,391,844 | A * | 2/1995 | Johnson | G01G 21/24 177/229 |
| 5,440,077 | A * | 8/1995 | Konishi | G01G 3/1414 177/229 |
| 5,510,581 | A * | 4/1996 | Angel | G01L 1/2231 177/229 |
| 5,623,128 | A | 4/1997 | Grimm et al. | |
| 5,723,826 | A | 3/1998 | Kitagawa et al. | |
| 6,215,078 | B1 | 4/2001 | Torres et al. | |
| 6,318,184 | B1 * | 11/2001 | Kimerer, Jr. | G01B 7/16 73/862.633 |
| 6,817,255 | B2 * | 11/2004 | Haque | H01L 22/34 73/862.638 |
| 7,690,270 | B1 * | 4/2010 | Park | G01L 1/127 73/862.61 |
| 8,153,913 | B2 * | 4/2012 | Haefeli | G01G 21/30 73/862.633 |
| 8,186,232 | B2 * | 5/2012 | McDearmon | G01B 7/16 73/862.632 |
| 9,903,772 | B2 * | 2/2018 | Schmittner | G01G 23/005 |
| 10,121,121 | B1 | 11/2018 | De Bonet et al. | |
| 10,198,710 | B1 | 2/2019 | Hahn et al. | |
| 10,746,589 | B1 | 8/2020 | Danenberg et al. | |
| 10,809,122 | B1 | 10/2020 | Danenberg et al. | |
| 10,830,633 | B2 | 11/2020 | Fiehn et al. | |
| 10,969,267 | B1 | 4/2021 | Franklin et al. | |
| 11,125,607 | B1 | 9/2021 | Justice et al. | |
| 2003/0047603 | A1 | 3/2003 | Lustenberger et al. | |
| 2003/0131672 | A1 * | 7/2003 | Norling | G01L 1/127 73/862.627 |
| 2004/0060372 | A1 * | 4/2004 | Hopkins | G01L 1/2243 73/862.637 |
| 2006/0070463 | A1 * | 4/2006 | Walker | G01L 1/2243 73/862.627 |
| 2006/0117871 | A1 * | 6/2006 | Wilner | G01L 9/0042 73/862.627 |
| 2014/0165745 | A1 * | 6/2014 | Pascucci | G01L 1/2243 73/862.632 |
| 2014/0291042 | A1 * | 10/2014 | Tsu | G01L 1/2206 73/862.632 |
| 2016/0003696 | A1 * | 1/2016 | Longman | B62M 3/16 73/862.621 |
| 2021/0196059 | A1 * | 7/2021 | Fritsch | A47F 5/0018 |
| 2021/0199490 | A1 | 7/2021 | Fritsch et al. | |

FOREIGN PATENT DOCUMENTS

| | | |
|---|---|---|
| DE | 102008056715 A1 | 5/2010 |
| EP | 0251175 A2 | 1/1988 |
| EP | 1319173 B1 | 6/2005 |
| WO | WO 2019220400 A1 | 11/2019 |

OTHER PUBLICATIONS

U.S. Appl. No. 17/123,131, filed Dec. 16, 2020.
U.S. Appl. No. 17/124,508, filed Dec. 17, 2020.

* cited by examiner

LOAD CELL

CROSS-REFERENCE TO PRIOR APPLICATIONS

Priority is claimed to European Patent Application No. 19 220 094.7, filed on Dec. 30, 2019, the entire disclosure of which is hereby incorporated by reference herein.

FIELD

The present invention relates to a load cell.

BACKGROUND

In many load cells, attachment at the force-supporting side is accomplished through bores that penetrate the force transducer in the vertical direction. The strain gauges are configured in the horizontal direction, and thus, perpendicular to the axes of the mounting holes. In a departure from this, DE3733961A1 describes a load cell whose bores for attachment at the force-supporting side penetrate the measuring body in the horizontal direction. Thus, a load cell attached in this manner at the force-supporting side is configured in such a way that the attachment at the force-introduction side is also in the horizontal direction, and that the strain gauges are attached to a deformable member in the vertical direction; i.e., perpendicularly to the axes of the force-supporting-side and force-introduction-side attachment means.

SUMMARY

In an embodiment, the present invention provides a load cell that has a monolithic measuring body. The monolithic measuring body has: a force-supporting section; a force-introduction section; and a linkage section disposed between the force-supporting section and the force-introduction section. The monolithic measuring body has a longitudinal axis between a force-supporting-side axial end and a force-introduction-side axial end. The longitudinal axis is configured to extend in a horizontal direction. The monolithic measuring body further has, in the force-supporting section, at least one mounting hole for attachment of the monolithic measuring body, the axis of the at least one mounting hole extending in the horizontal direction. At least one strain gauge is configured to sense tensile or compressive deformation of the monolithic measuring body and is in a region of the linkage section on a top side or a bottom side of the monolithic measuring body, the at least one strain gauge being oriented in the horizontal direction.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Figure 1:
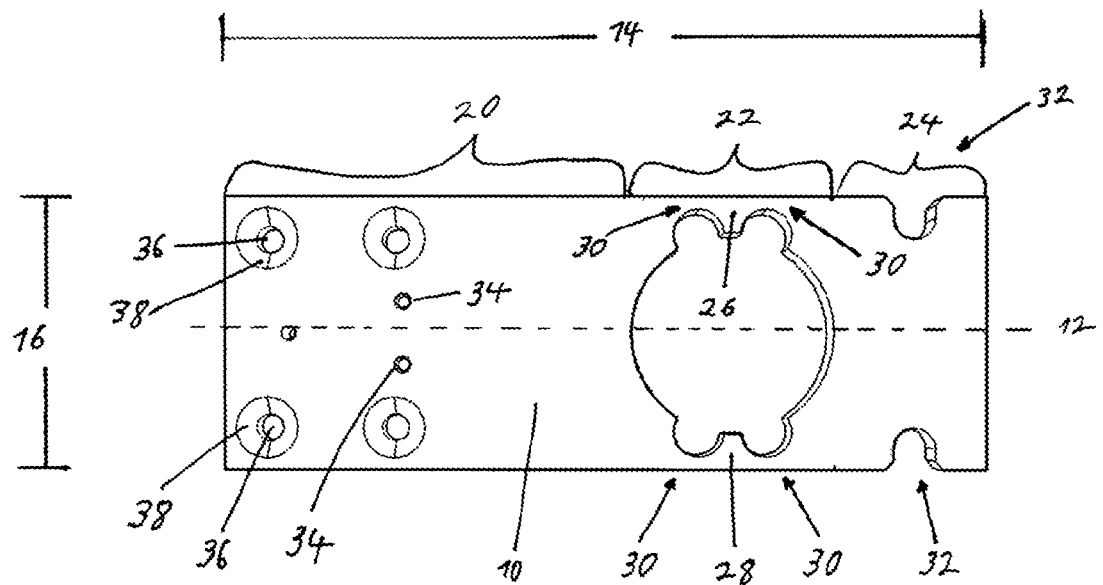
FIG. 1 is a front view of an inventive measuring body for a load cell according to the invention.

Embodiments of the present invention provide an improved load cell, and particularly a load cell that provides increased flexibility in terms of installation and is narrower in construction.

In accordance with the invention, there is provided a load cell having a monolithic measuring body including a force-supporting section, a force-introduction section, and a linkage section disposed between the force-supporting section and the force-introduction section. The measuring body has a longitudinal axis between a force-supporting-side axial end and a force-introduction-side axial end. The longitudinal axis is configured to extend in a horizontal direction, and the measuring body includes, in its force-supporting section, at least one mounting hole for attachment of the measuring body. The axis of the at least one mounting hole extends in a horizontal direction. In particular, the longitudinal axis of the measuring body and the axis of the mounting hole are orthogonal to each other. That is, the axis of the mounting hole and the longitudinal axis of the measuring body define the directions of the horizontal plane. In particular, the linkage section forms a parallelogram linkage, which is movable in the vertical direction. The load cell includes at least one strain gauge adapted to sense tensile or compressive deformation of the measuring body and disposed in the region of the linkage section on the top or bottom side of the measuring body. The strain gauge senses, in particular, the deformation of the linkage section. The at least one strain gauge is oriented in the horizontal direction. This has the advantage that the load cell can be fastened laterally to a support with screws. In many cases, this is an advantage when the support is a vertical surface, such as a wall. With this type of attachment, the force-supporting section, and thus the entire load cell, can be made particularly narrow. This is advantageous, particularly when there is little lateral space available for the load cell.

In an embodiment, the at least one strain gauge is formed by a resistive trace configured in parallel meanders. That is, the meandering resistive trace defines a plane. The meandering resistive trace is located in the horizontal plane. The meandering trace resistive is oriented parallel to the longitudinal axis of the measuring body.

In an embodiment, the linkage section includes at least one, in particular two, narrowed portions at an upper linkage member, and at least one, in particular two, narrowed portions at a lower linkage member extending parallel to the upper linkage member.

In an embodiment, the load cell includes, in the region of each of the two narrowed portions of the upper linkage member, a strain gauge disposed on the top side of the upper linkage member. In an embodiment, the load cell additionally includes, in the region of each of the two narrowed portions of the lower linkage member, a strain gauge disposed on the bottom side of the lower linkage member. The four strain gauges of the load cell are interconnected to form a Wheatstone bridge. In an embodiment, the interconnection of the two strain gauges disposed on the top side and the two strain gauges disposed on the top side are provided on a strain gauge film. In an embodiment, the interconnection of the two strain gauges disposed on the bottom side and the two strain gauges disposed on the bottom side are provided on a strain gauge film.

In an embodiment, the load cell includes, in the region of each of the two narrowed portions of the upper linkage member, two strain gauges disposed on the top side of the upper linkage member. The respective two strain gauges are oriented in parallel and arranged adjacent to each other with respect to a narrow side of the measuring body. The four strain gauges of the load cell are interconnected to form a Wheatstone bridge. In an embodiment, the interconnection of the strain gauges and the strain gauges are provided on a strain gauge film. In other words, this means that the four strain gauges are interconnected to form a Wheatstone bridge. The strain gauges are all oriented in the same direction, namely parallel to the longitudinal axis of the measuring body. The four strain gauges are arranged in pairs, the strain gauges of each pair of strain gauges being positioned adjacent to each other with respect to their orientation. Each pair of strain gauges is attached to the top side of the upper linkage member. A pair of adjacent strain gauges is located in the region of each of the two narrowed portions of the upper linkage member of the measuring body.

In an embodiment, all narrowed portions have the same thickness. In an embodiment, all narrowed portions have the same shape.

In an embodiment, the force-introduction section of the measuring body is formed on the top surface with a bore in which the object to be measured is threadedly fastened. In an embodiment, the force-introduction section has a receptacle in the form of a recess originating at the top side of the measuring body and extending perpendicularly to the longitudinal axis. In an embodiment, the recess of the receptacle is formed in the narrow direction of the measuring body over the entire width of the measuring body. In an embodiment, the recess of the receptacle has a round contour at its side facing away from the top side of the measuring body. This recess is to be formed during the manufacture of the measuring body, for example, by drilling a hole into the measuring body. This hole is then milled out toward the top side of the measuring body. In an embodiment, the load cell includes an insert which is in form-fitting engagement with the round contour of the receptacle. At its side opposite the form-fitting engagement with the round contour, the insert has a rectangular contour for receiving a force-transmitting member. That is, the insert is substantially U-shaped.

In an embodiment, the force-transmitting member is configured such that it can be form-fittingly received in the rectangular contour of the insert. That is, the force-transmitting member has substantially the shape of an inverted U. The force-transmitting member has an edge for supporting an object to be weighed, in particular a cross bar to be weighed. Thus, the object to be weighed is not rigidly connected to the measuring body, which results in torque-free reception of forces. In other words, the measuring body is not strained by the rigidly connected object to be weighed. This is advantageous, particularly when the load cell is used for multi-point measurements.

In an embodiment, the measuring body is mirror-symmetric with respect to a plane oriented parallel to the longitudinal axis and to the axis of the at least one mounting hole. In other words, this means that if the narrow long side of the measuring body is oriented horizontally, then the measuring body is symmetric with respect to a horizontal plane which extends through the measuring body at half its height. A receptacle for an insert is also formed at the bottom side of the measuring body. This side is not intended for the introduction of a force to be measured. However, the measuring body may serve as a measuring body for a load cell when in a position rotated 180°, so that the bottom side becomes the top side. In this orientation, the force is then introduced via the formerly lower receptacle. This has the advantage that the measuring body may serve as a basis for load cells which are configured from left to right as follows: force-introduction section, linkage section, force-supporting section, as well as force-supporting section, linkage section, force-introduction section. Thus, the measuring body is universally usable for the production of load cells having different orientations. In an embodiment, the measuring body has a length along its longitudinal axis, a height from the top side of the upper linkage member to the bottom side of the lower linkage member, and a width in the dimension that is orthogonal to the length and height. The width of the measuring body is between 3 mm and 40 mm, in particular between 5 mm and 20 mm. The length of the measuring body is 15 to 25 times, in particular 16 to 20 times, the width. The height of the measuring body is 5 to 10 times, in particular 5 to 8 times, the width of the measuring body. In comparison to known prior art load cells, the measuring body of the load cell according to the invention is very narrow in width and very large in height. Due to the changed dimensions, the mechanical behavior of the measuring body under the action of a force exerted from above differs strongly from that of conventional load cells. The advantage of such dimensioning is, in particular, that because of the shape of the measuring body, the narrowed portions need not be finished separately, and above all not individually. Due to the dimensioning of the measuring body, tolerances have a lesser impact on measurements. Thus, all four narrowed portions can be configured identically, whereas in prior art measuring bodies, the narrowed portions at the top and bottom of the linkage section have different thicknesses and must frequently be individually finished; i.e., balanced, during manufacture.

In an embodiment, the length of the force-introduction section along the longitudinal axis of the measuring body is between 15% and 25%, in particular 20%, of the length of the measuring body. The length of the linkage section along the longitudinal axis of the measuring body is between 20% and 30%, in particular 25%, of the length of the measuring body. The length of the force-supporting section along the longitudinal axis of the measuring body is between 65% and 45%, in particular 55%, of the length of the measuring body. In an embodiment, the measuring body includes at least three, in particular four, mounting holes formed as bores and extending through the measuring body in the horizontal direction, with particularly the bores on one side being provided with countersinks configured to receive countersunk screw heads. In contrast to known load cells, the force-supporting section is relatively large. This allows the screws for attaching the measuring body to be disposed in a direction transverse to the direction of deformation. Thus, the axes of the mounting screws are oriented parallel to the width of the measuring body; i.e., along its smallest dimension. The large surface area of the force-supporting section provides for stable mounting of the measuring body to a vertical mounting surface, such as a vertical support or a wall, without appreciable mechanical stresses arising in the region of the mounting holes as a result of forces introduced into the force-introduction section. Thus, the mounting holes do not affect the measurement accuracy.

In an embodiment, the measuring body has a depression extending along its longitudinal axis from a linkage-section-proximate portion of the force-supporting section to the linkage section and adapted to at least partially receive a circuit board having electronics mounted thereon, in particular an analog-to-digital converter for processing at least one output signal from the at least one strain gauge.

FIG. 1 schematically shows, in front view, a measuring body 10 for a load cell according to the invention. Measuring body 10 serves as a deformable body, a weight force acting on measuring body 10 being inferred from the deformation of the deformable body. Measuring body 10 includes a force-introduction section 24, a linkage section 22, and a force-supporting section 20.

A weight force to be measured is applied to force-introduction section 24. Via its force-supporting section 20, measuring body 10 is attached to a stable object. Measuring body 10 has a longitudinal axis 12 between its force-supporting-side axial end and its force-introduction-side axial end. Along its longitudinal axis 12, the measuring body has an extent in the longitudinal direction, a length 14. Orthogonally to its extent along longitudinal axis 12, the measuring body has an extent in the vertical direction, a height 16. The measuring body has an extent in a third dimension, rearward in FIG. 1, a width 18 (see FIG. 4). By way of example, a measuring body 10 has a width 18 of 10 mm, a height 16 of 65 mm, and a length 14 of 180 mm. Along longitudinal axis 12, force-introduction section 24 covers approximately 20% of length 14 of measuring body 10, linkage section 22 covers approximately 25%, and force-supporting section 20 covers approximately 55% of length 14.

In the view of FIG. 1, measuring body 91 is symmetric with respect to a horizontal plane that divides the measuring body centrally in the direction of the height. Force-introduction section 24 is provided with a receptacle 32 which completely penetrates measuring body 10 in the direction of its width 18. Receptacle 32 takes the form of a bore formed in the region of the top side of the measuring body, the bore being milled out toward the top side of the measuring body. Accordingly, in a direction toward measuring body 10, receptacle 32 has a round contour in measuring body 10.

Another receptacle is formed at the bottom side of measuring body 10 in the region of the force-introduction section. In the region of the linkage section, measuring body 10 is penetrated by a round opening over a substantial portion of its height. In the upper and lower regions of the penetration created in this manner, there are respectively formed two smaller round openings which also completely penetrate measuring body 10.

Thus, measuring body 10 is formed with an upper linkage member 26 having two narrowed portions 30 and a lower linkage member 28 having two narrowed portions 30. Narrowed portions 30 have the effect that linkage member 22 is deformed in response to forces acting on force-introduction section 24. Linkage member 22 is a parallelogram linkage. Force-supporting section 20 of measuring body 10 has four mounting holes 36 formed therein which also penetrate measuring body 10 in the direction of its width 18. Mounting holes 36 are provided with countersinks 38, so that measuring body 10 can be screwed to a stable object with countersunk screws. Furthermore, force-supporting section 20 of measuring body 10 is provided with bores 24 for attachment of a circuit board.

Figure 2:
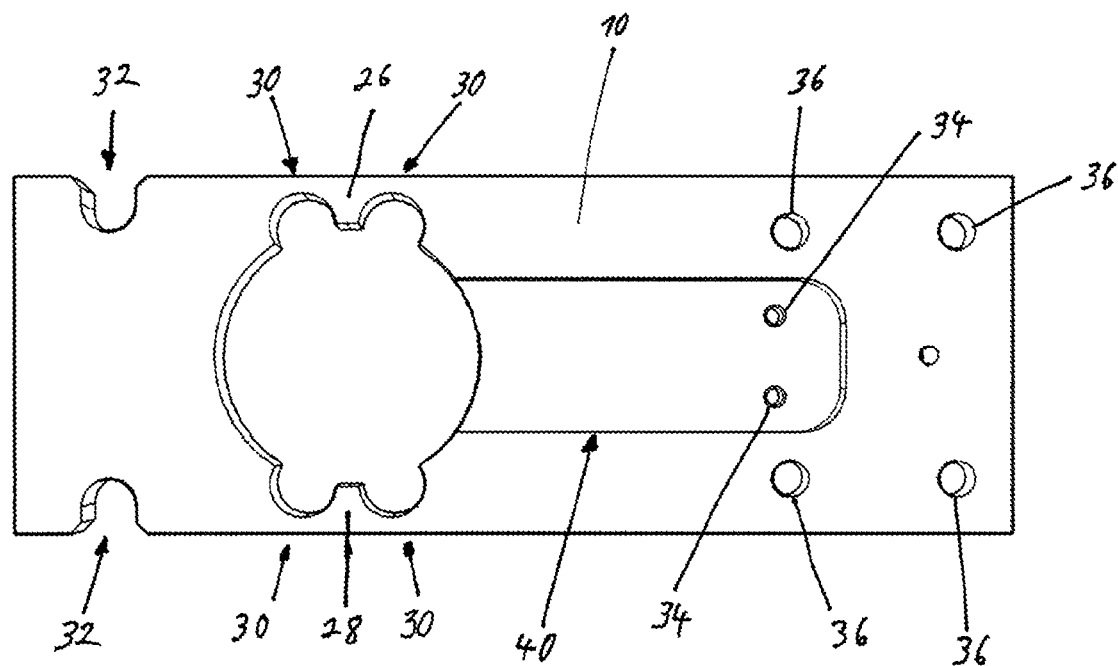
FIG. 2 is a rear view of a measuring body according to the invention.

FIG. 2 shows a measuring body 10 according to FIG. 1 in rear view. In this view, the measuring body of FIG. 1 is shown rotated along a vertical axis. Located in the region of force-supporting section 20 is a depression 40 extending to linkage section 22. Depression 40 does not penetrate measuring body 10 and does not provide additional deformability of measuring body 10. The bores 24 for attachment of a circuit board are located within depression 40. Depression 40 is intended to at least partially receive a circuit board, the circuit board having electronics mounted thereon, in particular an analog-to-digital converter for processing at least one output signal from the at least one strain gauge.

Figure 3:
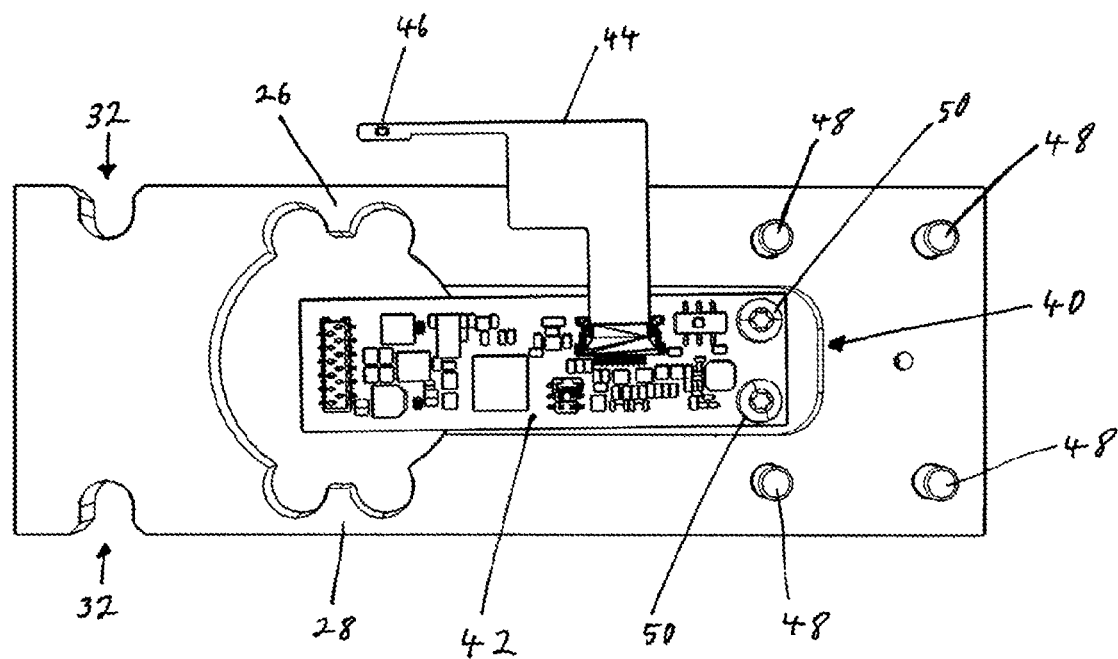
FIG. 3 is a rear view of a load cell according to the invention.

FIG. 3 shows the load cell in rear view. The orientation of measuring body 10 is the same as in FIG. 2. Shown in mounting holes 36 are screws 48 which serve to threadedly fasten the load cell via its force-supporting section 20 to a vertical support. Circuit board 42 is fastened within depression 40 of measuring body 10 with screws 50 in the bores 34 for circuit board 42. Connected to circuit board 42 is a conductor film 44 which serves for electrically contacting the strain gauges. Conductor film 42 has provided thereon a temperature sensor 46 which serves for temperature equalization purposes.

Figure 4:
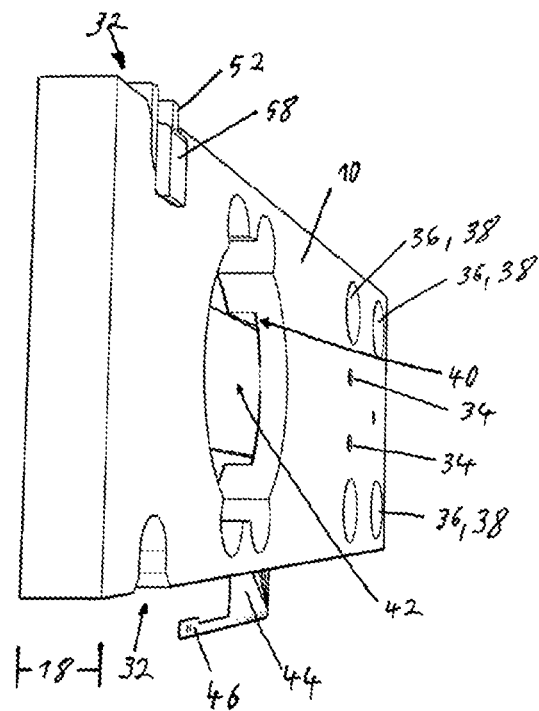
FIG. 4 is an isometric view of a load cell according to the invention.

FIG. 4 shows, in isometric view, a load cell having a measuring body 10. As can be readily seen in this view, width 18 of measuring body 10 is very small in relation to its height 16 and to its length 14. Furthermore, in FIG. 4, circuit board 42, located in depression 40 of measuring body 10, can be seen through the opening in linkage section 22. An insert 52 and a force-transmitting member 58, which will be described in more detail below, are shown in upper receptacle 32 of measuring body 10.

Figure 5:
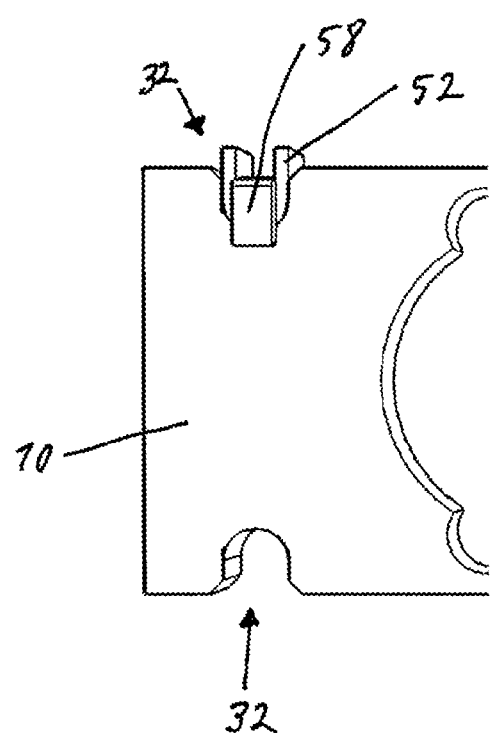
FIG. 5 is a front view showing the force-introduction section of an inventive load cell with an insert and a force-transmitting member.

FIG. 5 depicts the force-introduction section 24 of a measuring body 10 with an insert 52 in form-fitting engagement with the round contour of receptacle 32 of the measuring body. Insert 52 holds a force-transmitting member 58.

Figure 6:
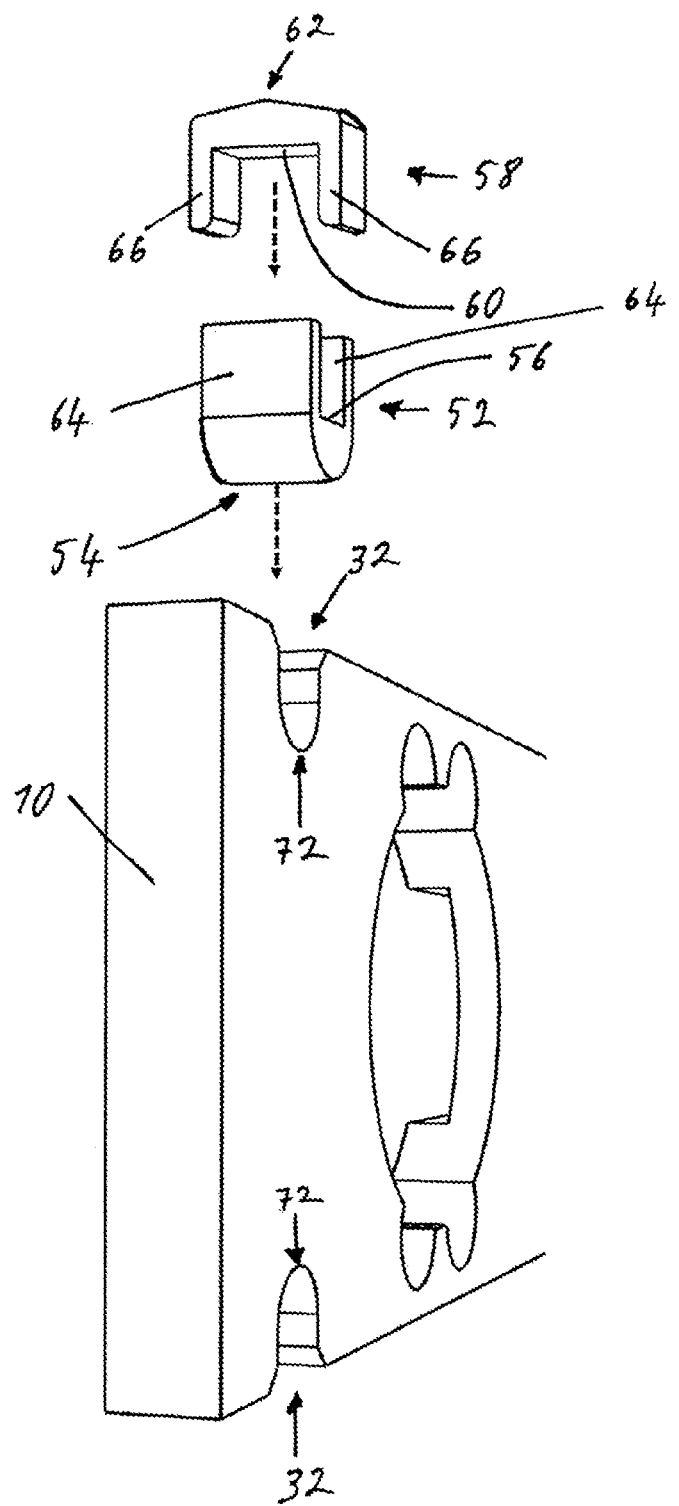
FIG. 6 is an exploded view of an inventive load cell showing the force-introduction section with an insert and a force-transmitting member.

To illustrate the interaction of receptacle 32, insert 52, and force-transmitting member 58, FIG. 6 shows measuring body 10, insert 52, and force-transmitting member 58 in exploded isometric view. Insert 52 is inserted into receptacle 32, with round contour 54 at the bottom side of insert 52 coming into form-fitting engagement with round contour 72 of receptacle 32 of measuring body 10. Insert 52 is substantially U-shaped and has a rectangular contour 56 at its inner side. The width of insert 52 is equal to width 18 of measuring body 10. Force-transmitting member 58 is also substantially U-shaped, but rotated 90° about a vertical axis with respect to insert 52. Moreover, force-transmitting member 58 is rotated 180° about a horizontal axis with respect to insert 52. At its inner side, force-transmitting member 58 has a rectangular contour 60 designed to rest on rectangular contour 56 of insert 52. Force-transmitting member 58 is disposed such that its limbs 66 reach beyond insert 52 and partially project over measuring body 10, so that the U-shaped configuration of force-transmitting member 58 prevents insert 52 from slipping out of receptacle 32 and also prevents force-transmitting member 58 itself from slipping relative to measuring body 10. At its top side, force-transmitting member 58 has an edge; i.e., an acute contact axis for an object to be measured. In the assembled condition of insert 52 and force-transmitting member 58, edge 62 of force-transmitting member 58 is oriented parallel to longitudinal axis 12 of measuring body 10. Limbs 64 of insert 52 reach beyond edge 62 of force-transmitting member 58, so that they form a boundary for the edge along longitudinal axis 12 of measuring body 10. An object, such as a rod or bar, which rests on edge 62 of force-transmitting member 58 and weighed, is prevented by limbs 64 of insert 52 from slipping beyond edge 62 of force-transmitting member 58 in the direction of longitudinal axis 12 of measuring body 10.

Figure 7:
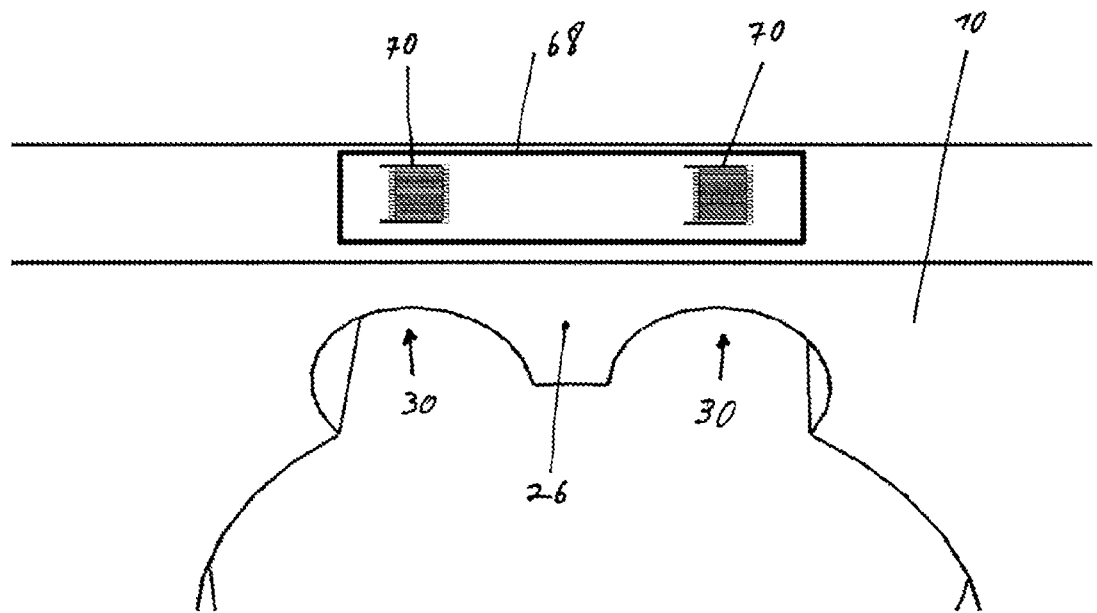
FIGS. 7 and 8 are isometric views showing a measuring body of an inventive load cell with strain gauges.

FIG. 7 shows an isometric top view of linkage section 20 of measuring body 10 of the load cell. A strain gauge film 68 with two strain gauges 70 is attached to narrowed portions 30 of upper linkage member 26. The interconnection of strain gauges 70 on the film and the electrical contacting of the strain gauge film are not illustrated for the sake of clarity. The two strain gauges 70 and two further strain gauges, which are attached to the bottom side of lower linkage member 28, are interconnected to form a Wheatstone bridge (bridge circuit). Strain gauges 70 are electrically contacted to conductor film 44 and thus to circuit board 42 of the load cell.

Figure 8:
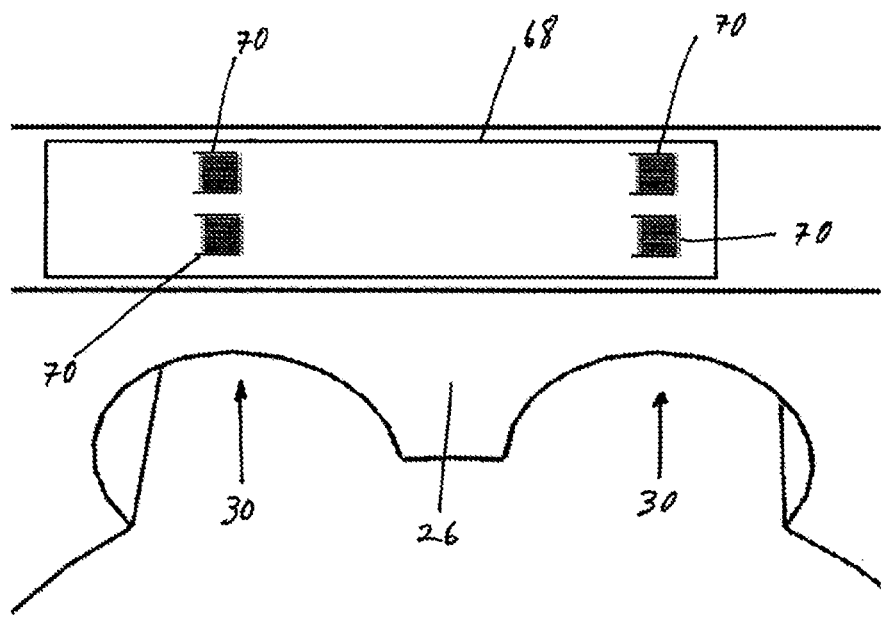

FIG. 8 shows an isometric top view of the linkage section of measuring body 10 of the load cell. A strain gauge film 68 with four strain gauges 70 is attached to narrowed portions 30 of upper linkage member 26. The four strain gauges 70 are interconnected on the strain gauge film to form a Wheatstone bridge, and are electrically connected to circuit board 42 via conductor film 44. The orientation of the meandering resistive traces of strain gauges 70 on upper linkage member 6, or on upper and lower linkage members 26, 28, is always in the direction of longitudinal axis 12 of measuring body 10. Strain gauges 70 are each oriented in the horizontal direction. That is, the surface created by the meandering arrangement of the resistive traces of strain gauge 70 is horizontal, so that strain gauges 70 are disposed on the top side of upper linkage member 26 or on the bottom side of lower linkage member 28. The orientation of this surface in a Cartesian coordinate system corresponds to the orientation of the narrow long side of measuring body 10.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A load cell comprising:
   a monolithic measuring body comprising:
      a force-supporting section;
      a force-introduction section; and
      a linkage section disposed between the force-supporting section and the force-introduction section,
      the monolithic measuring body having a longitudinal axis between a force-supporting-side axial end and a force-introduction-side axial end,
      the longitudinal axis being configured to extend in a horizontal direction, and
      the monolithic measuring body further comprising, in the force-supporting section, at least one mounting hole for attachment of the monolithic measuring body, the axis of the at least one mounting hole extending in the horizontal direction; and
   at least one strain gauge configured to sense tensile or compressive deformation of the monolithic measuring body and disposed in a region of the linkage section on a top side or a bottom side of the monolithic measuring body, the at least one strain gauge being oriented in the horizontal direction,
   wherein the force-introduction section has a receptacle in a form of a recess originating at the top side of the monolithic measuring body and extending perpendicularly to the longitudinal axis,
   wherein the recess of the receptacle is formed in a narrow direction of the monolithic measuring body over its entire width,
   wherein the recess of the receptacle has a round contour at its side facing away from the top side of the monolithic measuring body, and
   wherein the load cell comprises an insert which is in form-fitting engagement with the round contour of the receptacle, the insert being formed, at its side opposite the form-fitting engagement with the round contour, with a rectangular contour for receiving a force-transmitting member.

2. The load cell as recited in claim 1, wherein the at least one strain gauge is formed by a resistive track configured in parallel meanders and oriented parallel to the longitudinal axis of the monolithic measuring body.

3. The load cell as recited in claim 1, wherein the linkage section comprises at least one narrowed portion at an upper linkage member, and at least one narrowed portion at a lower linkage member extending parallel to the upper linkage member.

4. The load cell as recited in claim 3,
   wherein the at least one narrowed portion at the upper linkage member comprises two narrowed portions,
   wherein the at least one narrowed portions at the lower linkage member comprises two narrowed portions,
   wherein the load cell comprises four strain gauges comprising the at least one strain gauge, the four strain gauges comprising:
      two strain gauges disposed on a top side of the upper linkage member, one each in a region of each of the two narrowed portions of the upper linkage member; and
      two strain gauges disposed on a bottom side of the lower linkage member, one each in a region of each of the two narrowed portions of the lower linkage member;
   wherein the four strain gauges of the load cell are interconnected to form a Wheatstone bridge.

5. The load cell as recited in claim 3,
wherein the at least one narrowed portion at the upper linkage member comprises two narrowed portions,
wherein the at least one narrowed portions at the lower linkage member comprises two narrowed portions,
wherein the load cell comprises four strain gauges comprising the at least one strain gauge, the four strain gauges comprising:
in a region of each of the two narrowed portions of the upper linkage member, two strain gauges disposed on a top side of the upper linkage member, the respective two strain gauges being oriented in parallel and arranged adjacent to each other with respect to a narrow side of the monolithic measuring body, and
wherein the four strain gauges of the load cell are interconnected to form a Wheatstone bridge.

6. The load cell as recited in claim 3, wherein all of the narrowed portions have a same thickness.

7. The load cell as recited in claim 1, wherein the force-transmitting member is configured such that it can be form-fittingly received in the rectangular contour of the insert, and in that the force-transmitting member has an edge for supporting a cross bar to be weighed.

8. The load cell as recited in claim 1, wherein the monolithic measuring body is mirror-symmetric with respect to a plane oriented parallel to the longitudinal axis and to the axis of the at least one mounting hole.

9. The load cell as recited in claim 1,
wherein the monolithic measuring body has:
a length along the longitudinal axis,
a height from a top side of an upper linkage member to a bottom side of a lower linkage member, and
a width in a dimension that is orthogonal to the length and height,
wherein the width of the monolithic measuring body is between 3 mm and 40 mm,
wherein the length of the monolithic measuring body is 15 to 25 times the width, and
wherein the height of the monolithic measuring body is 5 to 10 times the width of the monolithic measuring body.

10. The load cell as recited in claim 1,
wherein a length of the force-introduction section along the longitudinal axis of the monolithic measuring body is between 15% and 25%, of a length of the measuring body,
wherein a length of the linkage section along the longitudinal axis of the monolithic measuring body is between 20% and 30% of the length of the monolithic measuring body, and
wherein a length of the force-supporting section along the longitudinal axis of the monolithic measuring body is between 65% and 45% of the length of the monolithic measuring body.

11. The load cell as recited in claim 1, wherein the monolithic measuring body includes at least three mounting holes formed as bores and extending through the monolithic measuring body in the horizontal direction, with the bores on one side being provided with countersinks configured to receive countersunk screw heads.

12. The load cell as recited in claim 1, wherein the monolithic measuring body has a depression extending along the longitudinal axis from a linkage-section-proximate portion of the force-supporting section to the linkage section and adapted to at least partially receive a circuit board having electronics mounted thereon.

13. The load cell recited in claim 4, wherein the interconnection of the two strain gauges disposed on the top side and the two strain gauges disposed on the top side are provided on a strain gauge film, and the interconnection of the two strain gauges disposed on the bottom side and the two strain gauges disposed on the bottom side being provided on another strain gauge film.

14. The load cell as recited in claim 6, wherein all of the narrowed portions have a same shape.

15. The load cell as recited in claim 12, wherein the electronics comprises an analog-to-digital converter for processing at least one output signal from the at least one strain gauge.

16. The load cell as recited in claim 5, wherein the interconnection of the strain gauges and the strain gauges being are on a strain gauge film.

* * * * *